INVENTORS
GUSTAVE JAVAUX
JEAN-PIERRE VASSEUR

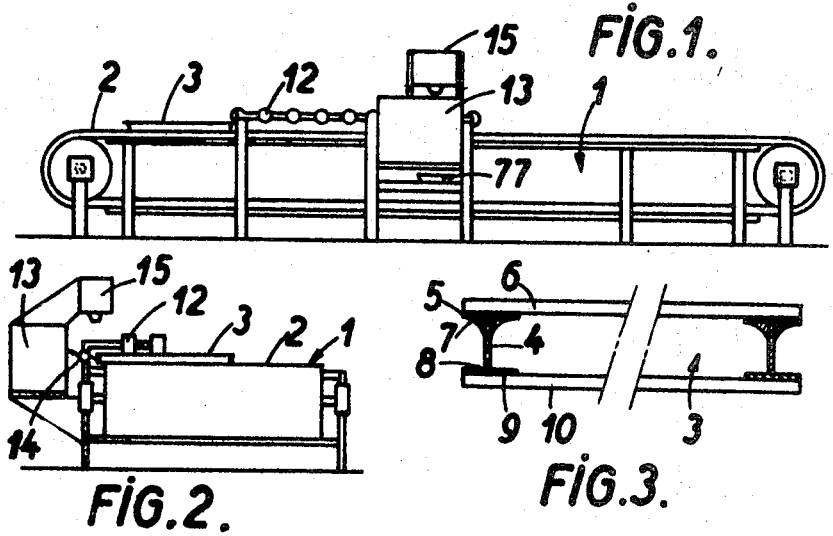
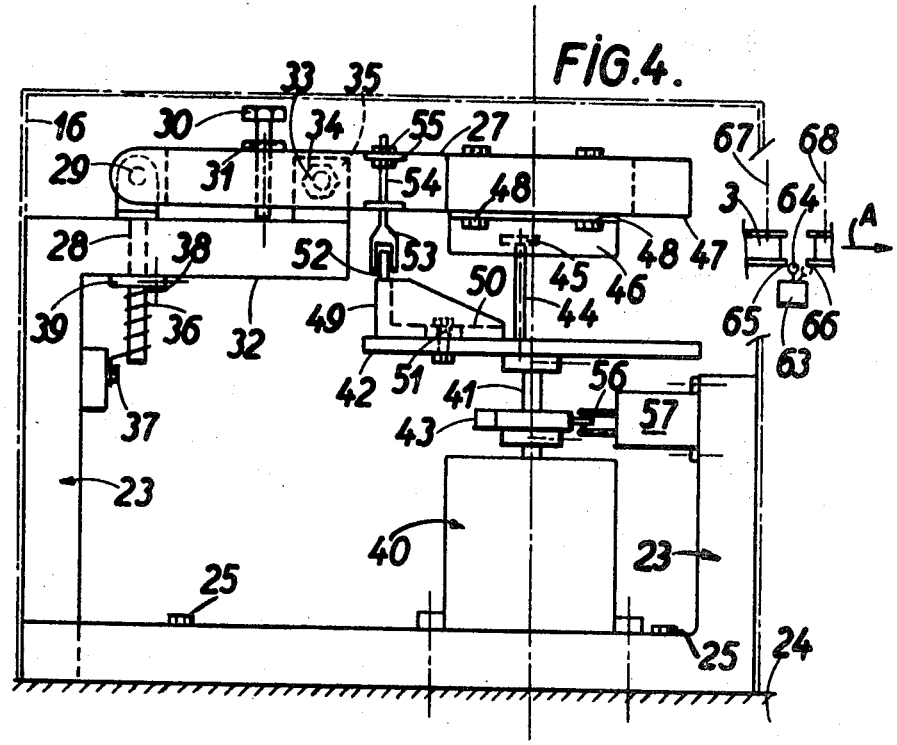

BY Spencer & Kaye
ATTORNEYS

3,543,385
PRODUCTION OF SOLDER JOINTS BETWEEN A SPACER STRIP AND A METALLIZED COATING IN A MULTIPLE PANE GLAZING UNIT
Gustave Javaux and Jean-Pierre Vasseur, Brussels, Belgium, assignors to Glaverbel S.A., Watermael-Boitsfort, Belgium
Filed Aug. 29, 1967, Ser. No. 664,142
Claims priority, application Luxembourg, Sept. 9, 1966, 31,916
Int. Cl. B23k *31/02*
U.S. Cl. 29—472.5
13 Claims

ABSTRACT OF THE DISCLOSURE

A method and apparatus for mass-producing solder joints between a spacer strip and a metallized coating in a multiple pane glazing unit by mechanically conveying the units in which the joints are to be formed at a predetermined speed past a soldering appliance, automatically bringing the appliance into contact with the joint and delivering solder thereto, and automatically lifting the appliance away from the joint at the end of the soldering pass, the movements of the appliance having a horizontal component and a vertical component which are independently selected for giving the compound movement any desired trajectory.

BACKGROUND OF THE INVENTION

This invention relates to a method and apparatus for carrying out repetitive soldering operations in mass production manufacture and to apparatus for use in that method.

When it is necessary to form a continuous solder joint along a junction line between components the operation has to be skillfully performed if an uninterrupted, uniform solder fillet is to be formed. Even when highly skilled workmen are employed, it has been found that an appreciable number of articles are usually rejected or must be touched up due to joint imperfections when it is attempted to mass-produce a joint of this type. Thus, the cost of producing such joints is relatively high.

SUMMARY OF THE INVENTION

It is a primary object of the present invention to overcome these drawbacks and difficulties.

Another object of this invention is to decrease the reject rate of such joints.

A further object of the present invention is to produce solder joints having a high degree of uniformity.

Yet another object of the present invention is to decrease the time required for producing a succession of solder joints.

The term "soldering" as used herein includes brazing. The predetermined velocity with which the articles move can be constant or can vary in a predetermined manner.

The invention is particularly intended to be applied in the formation of solder fillet joints or rabbet joints between two members meeting at an angle. Another important potential application is in the formation of solder joints wherein the solder is confined to a groove or slot, e.g., a slot between the margins of spaced parallel sheets. Particularly in the latter case, it is preferred, when carrying out the method to perform the soldering operation by directing molten solder into the groove or slot to be occupied by the jointing fillet or band of solder. The soldering appliance can in such cases take the form of a heated guide which directs a stream of molten solder into the groove or slot as this moves continuously past the guide.

In certain cases, however, equally good results may be obtainable by preliminarily locating solid solder along the joint line and melting the solder in situ. For example, when sheets are to be held or sealed together in spaced parallel relation by a solid band located between their margins, a solid strip, or strips, formed wholly or partly of solder can be located between the margins of the sheets, and the solder of the strip, or strips, can be progressively melted during passage by the soldering appliance. In such cases, the soldering appliance is merely required to apply sufficient heat to melt the solder and the appliance can be a gas burner, for example, which directs a flame onto the solder strip, or a high frequency induction heating means.

The article conveyor can take any form suited to the articles to be soldered but the conveyor drive must be smooth, i.e., there must be no jerking movements, so that during the soldering of each article, it moves steadily at a velocity which is constant or which varies according to a predetermined program.

It has been found that the formation of high quality joints of this type is aided if the individual joints are formed progressively while a precisely controlled continuous relative movement is maintained between the components to be joined and a soldering appliance. The present invention applies this principle to repetitive soldering by performing the soldering operations on successive articles while these are moved past a soldering station at a predetermined velocity or velocities by means of an article conveyor.

Broadly defined, the invention involves a method for performing soldering operations along the junction lines of a succession of articles, which method includes aligning a plurality of articles so that a junction line of each lies along a given path, conveying the plurality of articles in a direction parallel to the path and past a soldering zone, and soldering each article along its junction line as the article moves past the soldering zone.

The invention also includes apparatus for use in carrying out soldering operations by the method hereinbefore defined. Such apparatus essentially includes conveyor means for conveying the articles to be soldered at a predetermined velocity and for guiding the articles so that substantially the same path is followed by corresponding junction lines of each article, and at least one soldering station including a soldering appliance disposed adjacent such conveyor means for forming a solder joint along each junction line following such path as the conveyor means conveys each article in turn past such appliance.

A specific and important field of use of the invention is the manufacture of glazing units wherein sheets of glass are secured in parallel relation to a spacing strip or strips located between the sheets near their peripheries. The spacing strip or strips are of metal and in the assembly such strip or strips are connected to metallized faces of the glass sheets by means of solder fillets in the corners defined by the strip or strips and the projecting margins of the sheets.

The method according to the invention is very well suited for use in making such solder connections. In such application of the invention, the unit assemblies are placed flat on the conveyor and the soldering appliance is preferably a soldering iron to which molten solder is supplied and which directs such solder into the corner angle between a spacer strip and the upper surface of the underlying sheet.

Even if the spacer strip is of lead, the soldering iron can be maintained at a relatively high temperature because the relative movement between the iron and the work is continuous and can be fast enough to ensure that the spacer strip is not melted. The soldering iron can be caused to enter the slot between the projecting edges of the two sheets separated by the spacer, and then to move downwardly so that it comes to rest on the top of the lower sheet. This movement of the iron into its operative position preferably occurs just after the leading edge of the unit, or the leading end of the spacer strip, has reached the soldering station, so that there is no risk of the iron obstructing the forward movement of the unit. Molten solder may be released continuously from a point above the iron such that the iron intercepts the falling solder only when the iron is in a position to direct the solder to the joint. The solder released while the iron is in a withdrawn, inoperative, position may be collected, remelted and recycled.

The solder connections of units comprising two or more than two spaced parallel sheets of glass can also be formed as above referred to.

Solder connections along different edges of a unit can be formed by different soldering appliances or by successive movements past the same appliance. After forming solder fillets between the spacer strip or strips and the underlying sheet, the assembly can be inverted and solder fillets can then be formed between the spacer strip or strips and the sheet which was formerly on top of such strip(s).

A complete soldering installation for forming the solder joints in glazing units as above referred to may comprise two or more soldering stations spaced along the conveyor path for soldering different margins of a unit in succession and/or for laying solder deposits one on top of another.

BRIEF DESCRIPTION OF THE DRAWINGS

FIG. 1 is an elevational view of parts of a machine for soldering glazing units according to the present invention.

FIG. 2 is an end view of the machine parts shown in FIG. 1.

FIG. 3 shows a partly soldered double glazing unit in transverse cross section.

FIG. 4 is an end view of a soldering station of the machine shown in FIG. 1.

DESCRIPTION OF THE PREFERRED EMBODIMENTS

Figure 5:
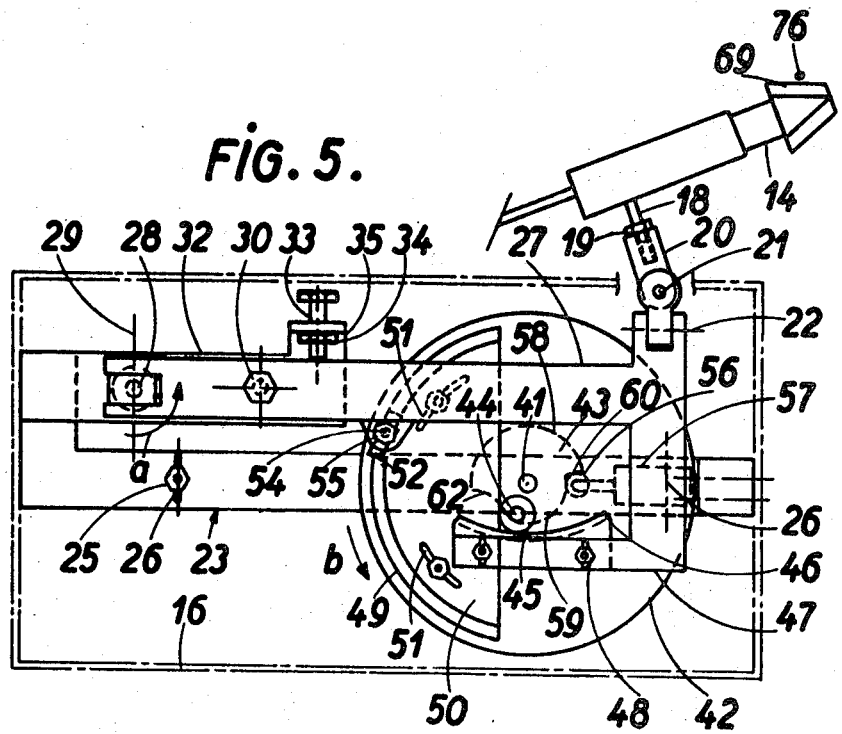
FIG. 5 is a plan view of the structure shown in FIG. 4.

The machine of which part is shown in FIGS. 1 and 2 includes a horizontal conveyor 1 incorporating endless chains 2 carrying transverse supports or rollers (not visible) for supporting double glazing units 3 to be soldered. One such glazing unit is shown in position in FIGS. 1 and 2 and in detail in FIG. 3.

Preparatory to soldering the unit shown in FIG. 3 by means of the illustrated apparatus, a spacer strip 4 which extends along all four margins of the unit is roughly soldered to a metallized coating 5 on the margin of the glass sheet 6, this rough soldering forming solder fillets 7. This preparatory soldering operation can be performed manually or mechanically and its purpose is merely to hold the spacer strip in proper position with respect to the sheet 6. The solder joint thus does not need to be of the desired final quality. The sheet 6 with the strip 4 soldered to it is placed on top of the second glass sheet 10 with the free edge of the strip 4 in contact with a metallized coating 8 on the margin of this sheet.

This assembly is then delivered to the conveyor 2 of the apparatus shown in FIGS. 1 and 2 and in this apparatus the strip 4 is united with sheet 10 along each margin of the assembly by a solder fillet which is formed along the corner defined between the strip 4 and the outwardly projecting metallized margin of the sheet 10. These solder fillets between the strip 4 and sheet 10 are each formed by two passes of the soldering iron. Also, in separate operations, a second pass of the soldering iron over the exposed solder fillets 7 is effected in order to perfect the joints between the strip 4 and sheet 6.

Unit assemblies as represented in FIG. 3 are disposed at successive positions along the conveyor 2 with the sheets 10 at the bottom and are laterally positioned by a suitable guide disposed along the conveyor. Such a side edge guide can, for example, be in the form of a fixed strip or a series of rollers rotatable about vertical axes.

Above the conveyor 2 there is a series of rollers 12 arranged to bear upon sheets 6 so as to hold the units 3 firmly down on the conveyor 2. The rollers 12 can be covered with a resilient material, e.g., foamed plastics, and can, if desired, be loosely or resiliently mounted so as to adapt to glazing units of different thicknesses and to exert a downward prsesure on the units under the influence of gravity or loading springs, and this pressure can, if desired, be adjustable, as by means of counterweights.

The unit assemblies thus gripped between the conveyor 2 and the rollers 12 are moved by the conveyor past a fixed soldering station 13. At this soldering station solder is deposited in the corner between each strip 4 and the lower glass sheet 10 along one margin of the glazing unit assembly. At subsequent soldering stations (not shown) of the machine, a second pass is made by a soldering iron along the same corner, and similar solder fillets are formed in the corners between strip 4 and the lower sheet 10 along the other margins of the unit assembly.

It is not always necessary to feed further solder during the second pass of the soldering iron along a joint line, such second pass can serve merely to improve the joint formed by the solder deposited in the previous soldering pass. It will suffice to describe the functioning of station 13 since the other soldering stations which apply solder function in a similar way. Various layouts of the different soldering stations in the complete machine will be described later in this specification.

The soldering station 13 is equipped with a soldering iron 14 to which molten solder is delivered from a container 15. The container 15 and the soldering iron are electrically heated to a temperature above the melting point of the solder.

The soldering appliance can be mounted for movement towards and away from the line of motion of the joints to be soldered and such movements of the appliance can be brought about manually or mechanically in appropriate relation to the speed of the conveyor and the spacing between successive article joints so that the appliance only occupies an operative position when an actual soldering operation is to proceed. Movement of the soldering appliance into and out of operative position may be achieved automatically in response to signals initiated by the articles themselves.

Depending on the form of the soldering appliance it can be advantageous for this appliance to rest in contact with the work during soldering and, as will hereafter be exemplified, the appliance can be mounted and operated so that it bears against the work under gravitational force and/or under pressure exerted by a spring.

The shape of the articles in the vicinity of their joint lines and the location of the line of motion of joints in relation to the conveyor might be such that the soldering appliance can not be brought from its inoperative to its operative position by straight line motion. Whether that be the case or not, it is advantageous for the movement of the appliance into its operative position to be the resultant of two or more components which are dependent on different control means. The resultant motion can then be modified by modifying or adjusting one or more of the different control means.

As is shown in FIGS. 4 and 5, the soldering iron 14 is automatically displaceable by a mechanism accommodated in the casing 16 forming part of station 13. This mechanism includes an arm 27 on which the soldering iron 14 is mounted by means of a hinge connector which has a vertical hinge axis 21 and which is rockable relative to the arm 27 about a horizontal axis 22. The soldering iron is connected to the component 20 of the hinge connector by a screw-threaded pin 18 and is locked thereto by a lock nut 19. The orientation of soldering iron 14 can thus be adjusted in both the horizontal and vertical planes, relative to the arm 27, by movement about axes 21 and 22, respectively. Further adjustments are possible by means of the screw-threaded connection between the soldering iron and hinge component 20 and by displacement of the supporting frame 23 carrying the arm 27 towards and away from the conveyor, the frame being held to a base 24 by bolts 25 which pass through slots 26 in the frame, the slots 26 extending transverse to the direction of the movement of units 3 past iron 14.

At its end remote from the soldering iron, the arm 27 is connected by a horizontal pivot pin 29 to a bracket on the upper end of a spindle 28 which is mounted in the supporting frame 23 for rotation about a vertical axis. The arm can therefore swing in a vertical plane about the axis of pin 29 and in a horizontal plane about the axis of spindle 28. The arm 27 is constantly urged in the direction of arrow a (FIG. 5) by a torsion spring 36 (FIG. 4) which surrounds spindle 28 and is connected at one end to the frame 23, as indicated at 37, and at the other end to collar 39 on the spindle 28.

FIGS. 4 and 5 show the arm 27 in its inoperative position, in which the soldering iron is spaced to one side of, and above, the line of motion of the adjacent edges of the glazing unit assemblies past the soldering station. The arm is held in this position against the force of gravity and the action of spring 36 by displaceable parts of the arm control mechanism to be described below.

As a glazing unit assembly 3 moves into soldering position, the arm 27 is swung counter-clockwise, with respect to the direction of view of FIG. 5, in the horizontal plane in the direction of arrow a so that the free end of the soldering iron moves into the space between the adjacent margins of the two parallel glass sheets 6 and 10 of the glazing unit. Simultaneously, or subsequently, the arm is lowered by a pivotal movement about the axis of pivot pin 29 so that the free end of the soldering iron moves downwardly towards the top surface of the lower glass sheet 10.

The lowest position to which the arm 27 can move is determined by the position of a stop formed by a bolt 30 which is threaded through an arm 27 and abuts against the top of the frame 23. The bolt 30 is locked in its adjusted position by a lock nut 31. The extent to which the arm 27 can pivot in the horizontal plane about the axis of spindle 28 and in the direction of the arrow a of FIG. 5 is limited by a stop formed by a bolt 33 which is threaded through a lug 35 on the frame 23 and which is locked in its adjusted position by a lock nut 34. These stops 30 and 33 must be preset in retracted positions relative to those shown in FIGS. 4 and 5 before the machine is put into operation to allow for the required movements of the arm 27 away from its illustrated inoperative position. It should be understood that the stops are here illustrated in positions in which they would permanently maintain the iron in its inoperative position and that these stops must be reset to retracted positions which are preferably such that the free end of the soldering iron will press inwardly and downwardly against the work, e.g., against the corner between members 4 and 8, under the combined action of gravity and the torsion spring 36 before the arm 27 abuts against the stops.

The control mechanism for the arm 27 is as follows: A driving unit 40 containing an electric motor 70 (shown diagrammatically in FIG. 6) and a conventional speed reducing gear (not shown) drives a vertical shaft 41 carrying a horizontal plate 42 and a cam 43. The plate 42 carries an eccentrically mounted post 44 at the upper end of which is a roller 45 which cooperates with an arcuate bearing face on a cam 46 mounted on an extension 47 rigid with arm 27. The cam 46 is connected to the extension 47 by bolts 48 which pass through slots in the extension. The slots permit the position of cam 46 to be adjusted with respect to extension 47 for adjusting the horizontal component of the inoperative position to which iron 14 will be moved by the action of roller 45 on cam 46.

The plate 42 also carries a cam shoe 49. The top of the shoe 49 has an inclined upper edge face serving as a cam which cooperates with a roller 52 rotatably supported by the forked end 53 of a pin 54 which is screwed to the arm 27 and which is held in adjusted position by lock nuts 55, the adjustment of pin 54 determining the vertical component of the inoperative position to which iron 14 will be moved as roller 52 rides up the cam defined by shoe 49.

In the illustrated position of the control mechanism, the roller 45 on the post 44 bears against the arcuate bearing face of the cam 46 so that the arm 27 is held in a retracted position against the action of the torsion spring 36. At the same time the follower roller 52 carried by the arm 27 rests on the high part of the cam shoe 49 so that the arm is also held in a raised position against the action of gravity.

When the driving unit 40 is switched on, the plate 42 is driven in the direction of arrow b in FIG. 5. As the plate turns, the roller 45 on the eccentric post 44 moves away from the face of cam 46 and, at the same time, the high part of cam shoe 49 moves from beneath the follower roller 52 so that the arm 27 is permitted to move downwardly about the axis of pin 29 and clockwise about the axis of spindle 28, under the combined action of torsion spring 36 and gravity, to carry the soldering iron towards its operative position. One of the advantages of the movement-producing means composed of cams and roller followers according to the present invention is that the plate 42 will continue to rotate, and to move the shoe 49 and follower 45, even if the iron 14 should reach its operative position before the rollers 45 and 52 reach the ends of their travel paths along their associated cams. In other words, the control mechanism can not be stalled if the iron 14 reaches its operative position while the rollers are at some intermediate point of travel along their cams.

The cam shoe 49 is fastened to plate 42 by bolts passing through arcuate slots 51 in a sole plate 50 of the shoe, and the position of the shoe can be angularly adjusted about the rotation axis of the plate 42 to vary the phase relationship between the horizontal and vertical components of motion of the arm 27. If desired, either or both of the parts 46 and 49 can be removed and replaced by parts with different profiles for imparting different horizontal and/or vertical components of motion, which may be linear or curved, to the arm 27 in order to adapt the apparatus to the requirements of different articles to be soldered.

The cam 43 on the shaft 41 of the driving unit operates the switching element 56 for the movable contact of an electric switch 57 fixed to the supporting frame 23. As is apparent in FIG. 5, the cam 43 has two substantially semicircular cam portions 58 and 59 of substantially different radii. These portions are joined by a step 60 at the trailing edge of portion 58 and a ramp portion 62 at the trailing edge of portion 59.

On the frame of the conveyor 1 there is mounted a second electric switch 63. This switch is shown on the right-hand side of FIG. 4 and is positioned between the vertical lines 67 and 68 delimiting the left-hand and right-hand extremities, respectively, of the heating edge 69 of iron 14. The switching element 64 of this switch is normally biased into a raised position and intrudes into the path of motion (indicated by arrow A) of the glazing unit assemblies so as to be pivoted to a depressed position when contacted by a unit.

Figure 6:
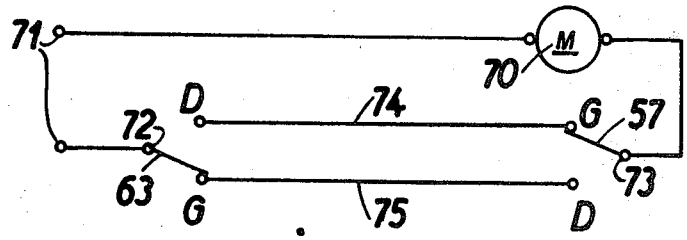
FIG. 6 is a diagram of part of the automatic control circuit of the structure shown in FIGS. 4 and 5.

The two switches 57 and 63 are break-make switches in the supply circuit of the motor 70 and, as shown in FIG. 6 the switches are connected to alternative branches 74 and 75 of this circuit so that the motor is only connected to the main supply via power input terminals 71 when the contacts of both switches connect to the same one of the branches. In FIG. 6 the positions D and G of the switch contacts correspond to the depressed and non-depressed positions, respectively, of the elements 56 and 64.

The mechanism cycle is as follows: When no glazing unit is in front of the soldering iron 14 the element 64 of switch 63 is in the position shown in solid lines in FIG. 4, i.e., in the position G of FIG. 6. The element 56 of the switch 57 is also in its left-hand position G, the element being at the foot of the step 60 of cam 43. The motor 70 is therefore not energized.

As a glazing unit assembly moving in the direction of arrow A moves into position at the soldering station the leading end of the assembly pivots the element 64 of switch 63 to the right, with regard to the view of FIG. 4, into the broken-line position, so that the switch contact is moved into position D (FIG. 6) and the motor is thus energized and rotates the plates 42 in the direction of arrow b (FIG. 5). The roller 45 and the cam shoe 49 are thus moved to release the arm 27 from its inoperative position so that this arm is permitted to undergo the horizontal and vertical components of motion for moving it towards its operative position as previously described.

When the plate 42 has rotated through 180°, from the position illustrated, the switching element 56 of switch 57 encounters the ramp 62 of cam 43 and is depressed to the right so as to move the switch contact into the position D shown in FIG. 6. Since switch 63 is at this time still in its position D, the circuit to motor 70 is broken and the motor stops, but the soldering iron remains in its operative position. When the rear edge of the glazing unit assembly which is being soldered moves out of contact with element 64 and hence permits the contact of switch 63 to return to its position G, the motor 70 starts again and during the resulting rotation of plate 42 the roller 45 and the cam shoe 49 move against the cam 46 and the follower roller 52, respectively, and return the arm 27 to its inoperative position. After the plate 42 has thus rotated through 180°, it returns to the illustrated position with the step 60 of cam 43 opposite the element 56 of switch 57 so that the current to the motor is switched off and the mechanism again comes to a halt in the position illustrated in FIGS. 4 and 5, ready for initiation of a further cycle by the arrival of the next glazing unit assembly at the soldering station.

The instant of arrival of the soldering iron in its operative position, in which it rests against the lower glass sheet of a glazing unit, is such in relation to the position of the unit at that instant that there is no risk of the soldering iron obstructing the advance of the unit, such as might occur if the left-hand end of edge 69, as viewed in FIG. 5, were to move in front of the leading edge 65 of the sheet or in front of the leading edge of the adjacent spacer strip 4. Also, the instant at which the soldering iron is lifted out of contact with the work must be such that there is no risk of the soldering iron dropping down behind the trailing edge 66 of the lower glass sheet and contacting or depositing solder on parts of the conveyor. The timing of the soldering iron movements in relation to the movements of the units must be such that at the end of a soldering operation, the unit which has been soldered is positioned with respect to the line 68 denoting the right-hand extremity of the heating edge 69 at the location shown in FIG. 4 when the iron is lifted out of contact with that unit. Similarly, at the moment when the iron moves into contact with the following unit at the start of a soldering operation, such following unit should have the position illustrated in FIG. 4 for the left-hand unit with respect to line 67 denoting the left-hand end of edge 69. The units to be soldered will generally not be as close together as the two units illustrated in FIG. 4, this illustration being primarily for the purpose of showing the positions of units at the start and finish of a soldering operation.

During the operation of the apparatus, molten solder is released drop by drop through an orifice in container 15 along a vertical path 76 represented in the plan view of FIG. 5. When the soldering iron is in its illustrated inoperative position, the solder falls past the iron and is received by a receptacle 77 (FIG. 1). When the soldering iron is in its operative position it intercepts the falling solder and guides it into the corner formed by the pieces to be joined to form the required solder fillet between the bottom glazing sheet and the spacer strip.

It is an important feature of the illustrated apparatus that the movements of the soldering iron into its operative position are controlled by the movements of the successive glazing unit assemblies into a predetermined position. Regularity of spacing between successive assemblies on the conveyor is therefore unnecessary.

A further important feature resides in the fact that the movement of the soldering iron to its operative position is terminated by contact with the work itself. By virtue of this feature it does not matter if the glazing unit assemblies are not quite accurately placed on the conveyor with respect to the lateral guide means. If the edge of an assembly to be soldered is a little to one side or the other of the predetermined line of motion, the iron will still move into bearing contact with the work. Also, this feature ensures that slight differences in the thicknesses of the glass sheets from one unit to another will not affect the operation of the machine.

Assuming that the spacer strips 4 of the glazing units are of lead, the speed of displacement of the units relative to the soldering iron during the soldering operation should be chosen high enough to ensure that these strips do not melt, notwithstanding that the temperature of the iron is maintained high enough to ensure high fluidity of the solder and consequent good penetration thereof into the joint so that the space enclosed between the glazing sheets is effectively sealed.

It will normally be appropriate to move the conveyor at a constant speed, but any required program of speed variation can be adopted. For example, the conveyor can be driven so that it accelerates or decelerates at a predetermined rate at the commencement and/or the termination of the formation of a solder layer.

The controlled regularity of the relative displacement occurring between the articles, or units, and the soldering appliances made possible by the mechanical conveyance of the articles ensures, other things being equal, that there will be a uniform or other predetermined distribution of heat along each joint as it progressively formed. Because the speed of relative displacement is continuous and is mechanically controlled, a sequence of soldering operations can be performed much more quickly than would be feasible by manually displacing a soldering iron along the joints.

Various modifications to the illustrated machine can easily be made. For example, the switch 63 can be replaced by an alternative type of detector device, e.g., by a mechanical, pneumatic, or hydraulic feeler device or a photoelectric cell. The pressure of the iron against the work can be increased or decreased by the use of adjustable counterweights.

As already indicated, a complete machine for soldering glazing units as shown in FIG. 3 will preferably incorporate a number of soldering stations. For example, referring to FIG. 7, there may be at one side of the conveyor 2 a lateral edge guide 11 for the units to be soldered, a pre-heating station 78, a first soldering station 79 functioning, like the station 13 of FIG. 1, to lay a solder deposit in the lower corner along one margin of the unit, an acid cleaning station 80, a second soldering station 81, identical to the station 79 but possibly not provided with a solder container 15, for improving the solder fillet, and a cleaning station 82 for cleaning the joint by means of brushes or otherwise. All of the units, except for units 79 and 81, can be constituted by well-known devices.

Opposite the soldering and cleaning stations a suction device 83 can be provided for drawing off harmful vapors. This device might include a fan or fans with an inlet conduit or conduits effective over the whole length of the conveyor path where the soldering and cleaning stations are located.

On the opposite edge of the conveyor there may be a similar series of stations for soldering the bottom corners along the opposite margin of the glazing units. These other stations may be located so as to function simultaneously with the units shown in FIG. 7 or they may be located downstream of the latter units so as to function subsequently along the path followed by the units. This latter arrangement, combined with means for the lateral translation of the glazing units across the conveyor, is to be preferred because units of various widths can be soldered without modification of the lateral spacing between the stations at opposite sides of the conveyor.

For soldering the bottom joints along the other edges of the glazing units (i.e., the edges extending transversely of conveyor 2) the same stations may be used. In that case the units must be conveyed a second time past these stations after having been angularly displaced by 90° with respect to their initial orientations.

The same stations may also be used for the second passes of a soldering iron along the pre-soldered corners between the strips 4 and the sheets 6. In this case the units will have to be fed again to the conveyor 2 after having been inverted with respect to their initial orientations so that the sheets 6 are at the bottom.

Figure 9:
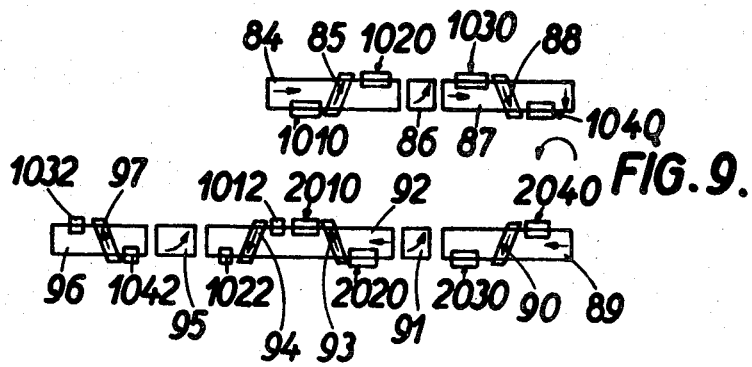
FIG. 9 is another view similar to that of FIG. 7 of a further layout.
Figure 10:
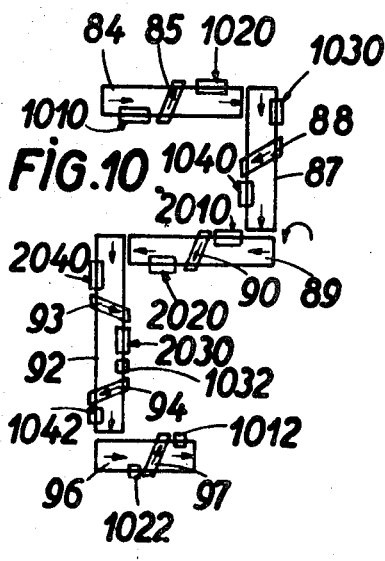
FIG. 10 is a further view similar to FIG. 7 of yet another layout.

Instead of using soldering stations adjacent one conveyor for soldering all of the joints of the glazing units, it is better to install a system of conveyors and associated soldering stations, with intervening devices for reorienting the units in transit from one conveyor to the next. Examples of such systems are shown in FIGS. 8 to 10.

Figure 7:
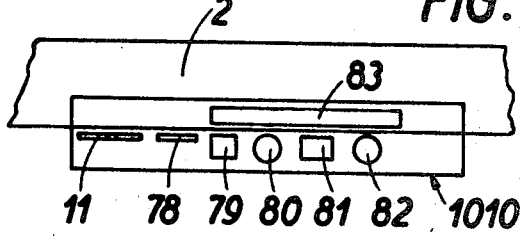
FIG. 7 is a diagrammatic representation of the layout of an apparatus according to the invention.
Figure 8:
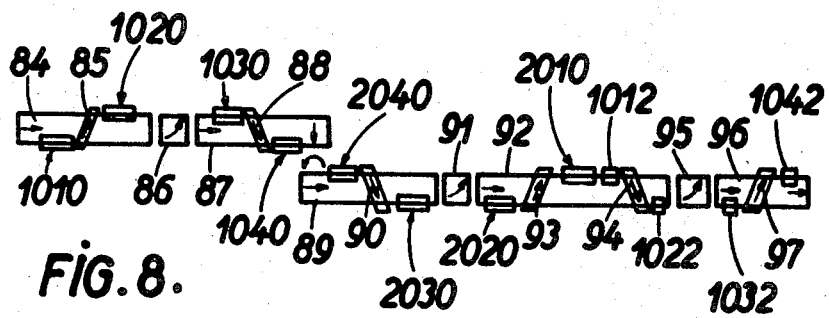
FIG. 8 is a view similar to that of FIG. 7 of another layout.

In the system shown in FIG. 8, the eight different joints of each rectangular double glazing unit are soldered successively. There is a first conveyor 84 with soldering and cleaning galleries 1010 and 1020 each of which includes a series of stations as shown in FIG. 7. The complete group of stations in FIG. 7 has therefore been labeled 1010.

Figure 11:
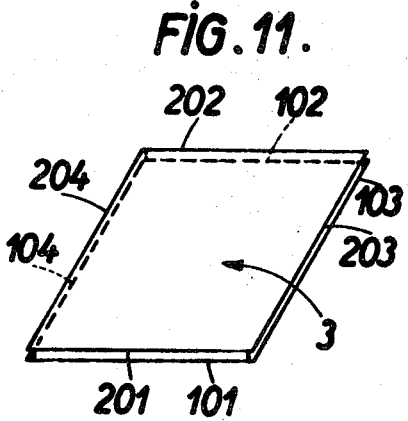
FIG. 11 is a diagrammatic representation of a double glazing unit produced according to the present invention.

Using the solder joint numbering of FIG. 11, which shows a double glazing unit assembly in which the spacer strip has been preliminarily roughly connected to the upper glass sheet, the joint 101 is soldered first at two soldering stations in gallery 1010. In the zone 85 each unit is translated, without being rotated, transversely of the conveying direction of conveyor 84 to bring its opposite bottom joint 102 into position for soldering at the gallery 1020. Devices for effecting such translational movements of articles on conveyors are well known per se. Alternatively the translation could be effected manually.

The glazing units then pass onto a turntable device 86 by which they are turned in the horizontal plane through an angle of 90°. Again, devices for turning articles in transit along a conveyor line are known per se and no detailed description is necessary. However, by way of example, the turning device may function in the manner of devices described in Belgian patent specification No. 520,562.

The units then pass from the device 86 to a second conveyor 87 provided with galleries 1030 and 1040 identical with galleries 1010 and 1020, respectively. At these galleries, the joints 103 and 104 are formed. The units are subsequently translated across the conveyor at a zone 88 between the two galleries 1030 and 1040.

The units are inverted, by any well-known means, or manually, upon leaving conveyor 87 and are fed in inverted position onto a conveyor 89. The conveyor 89 has two galleries 2040 and 2030 separated by a translation zone 90, and following conveyor 89 there is a further turntable device 91 and a further conveyor 92 with which galleries 2020 and 2010 and an intervening transfer zone 93 are associated. At the galleries associated with conveyors 89 and 92 the joints 201, 202, 203 and 204 are completed. It will be recalled that these joints were roughly soldered preparatory to feeding the assemblies to the machine and it may suffice simply to pass a heated soldering iron along these joints, without feeding further solder thereto. The galleries 2040, 2030, 2020 and 2010 therefore need incorporate only one soldering station each. Otherwise they are similar to the galleries associated with conveyors 84 and 87.

The conveyor 92 extends beyond gallery 2010 and past further stations 1012 and 1022 between which there is a translation zone 94. At the stations 1012 and 1022 a liquid dye composition of low surface tension is applied to the joints 101, 201, 102 and 202 to facilitate the detection of flaws in the joints. Beyond conveyor 92 there is a turntable device 95, and a final conveyor 96 with a translation zone 97 and two further stations 1032 and 1042 at which dye is applied to the joints 103, 203, 104, 204.

FIG. 9 shows an alternative layout of the conveyors shown in FIG. 8. In this layout the conveyors are distributed in two parallel rows. The units travel from left to right along the upper row and then, after inversion, move from right to lift along the bottom row.

Another alternative arrangement which may be advantageous when the available floor space is limited is shown in FIG. 10. In this layout, successive conveyors are arranged at right angles to one another in such a way as to obviate the need for the turntable devices 86, 91 and 95.

It will be appreciated that space can be saved if different joints of a unit are soldered by the same soldering station or stations, but this necessitates moving the units past such station or stations more than once, either by feeding the units back to the receiving end of the conveyor or conveyor train, or by reciprocating the conveyor or conveyors.

Glazing units composed of more than two spaced sheets of glass can also be soldered according to the invention. The further set or sets of joints present in such units can be soldered at further stations. Alternatively soldering stations having soldering appliances at different heights for soldering parallel superimposed joints simultaneously may be employed.

It will be understood that the above description of the present invention is susceptible to various modifications, changes, and adaptations, and the same are intended to be comprehended within the meaning and range of equivalents of the appended claims.

We claim:
1. In the manufacture of a succession of multiple pane glazing units each including at least two glass panes each provided with a metallized coating along its margins and a spacer strip disposed between the panes, a method of forming a solder joint along one junction line between the spacer strip and the metallized coating of one pane of each such unit in turn, comprising the steps of:
conveying each unit in succession past a soldering zone so that its one junction line substantially follows a given path;
resiliently urging a soldering appliance at the soldering zone toward the path, and normally holding the appliance in a retracted position spaced from the path;

releasing the appliance for permitting it to move against the junction line under the influence of the resilient urging when a unit enters the soldering zone, and returning the appliance to such retracted position, in opposition to the resilient urging, when such unit leaves the solder zone; and feeding molten solder onto the junction line at the area of contact with the appliance while the unit is in the soldering zone for forming a solder fillet along the junction line.

2. A method as defined in claim 1 wherein each glazing unit presents a plurality of junction lines and a solder joint is formed along each junction line in turn while conveying the unit past a succession of soldering zones.

3. A method as defined in claim 1 further comprising the step of sensing the movement of articles past the soldering appliance for automatically controlling said releasing step.

4. A method as defined in claim 1 wherein said step of feeding molten solder is carried out by continuously delivering molten solder from a point above the appliance along a path such that the solder will be intercepted by the appliance only when the latter is in its operative position, and collecting and recycling the solder delivered when the appliance is in its inoperative position.

5. Apparatus for forming solder joints along the junction lines of a succession of multiple pane glazing units, each unit including at least two glass panes provided with metallized coatings along their margins and a spacer strip between the panes, the strip forming one such junction line with the coating of each pane, the apparatus comprising, in combination:

conveyor means for conveying each unit in succession past a soldering zone so that one junction line of each unit substantially follows a given path;

holding means securing said unit with respect to said conveyor means;

a soldering station located at such soldering zone and including: a soldering appliance; and movable support means supporting said appliance for movement between a retracted position spaced from the path and a work position in which the appliance contacts a unit in the vicinity of its one junction line when such unit is in the soldering zone;

resilient urging means connected to said support means for urging said appliance to its said work position;

retracting means operatively associated with said support means for moving said appliance into its retracted position when a unit leaves the soldering zone; and release means disposed for responding to the entrance of a unit into the soldering zone and connected to said retracting means for freeing said support means from the influence of said retracting means, thereby to permit said appliance to move to its work position under the influence of said resilient urging means.

6. An arrangement as defined in claim 5 wherein said resilient urging means comprise first means for urging said appliance toward the metallized coating of such pane and second means for urging said appliance toward said spacer strip, whereby the combined motion produced by said first and second means causes said appliance to be guided by said metallized coating and said spacer strip toward the junction line along which a solder joint is to be formed.

7. An arrangement as defined in claim 6 wherein each said first and second means of said resilient urging means is independent of the other for permitting the combined motion of said appliance to be given any desired trajectory when moving between its work and retracted positions.

8. An arrangement as defined in claim 7 wherein said retracting means comprises a cam.

9. An arrangement as defined in claim 7 wherein said release means are arranged to continue operating even if said appliance arrives at its work position before reaching the end of the trajectory permitted by said release means.

10. An arrangement as defined in claim 7 wherein said second means of said resilient urging means comprises spring-biasing means arranged for urging said appliance against said spacer strip when said appliance is in its work position.

11. An arrangement as defined in claim 5 further comprising means for delivering molten solder, said means being disposed for delivering molten solder to said appliance when the latter is in its work position and for permitting the solder to flow past said appliance when the latter is in its retracted position, said appliance being arranged, when in its work position, to guide such solder to the junction line along which the solder joint is to be formed.

12. An arrangement as defined in claim 5 wherein there are provided a plurality of soldering stations spaced along the conveying path defined by said conveyor means.

13. Apparatus for forming solder joints along the junction lines of a succession of multiple pane glazing units, each unit including at least two glass panes provided with metallized coatings along their margins and a spacer strip between the panes, the strip forming one such junction line with the coating of each pane, the apparatus comprising, in combination:

conveyor means for conveying each unit in succession past a soldering zone so that one junction line of each unit substantially follows a given path through the soldering zone;

a soldering station located at such soldering zone and including; a soldering appliance; and movable support means supporting said appliance for movement between a retracted position spaced from the path and a work position in which the appliance contacts a unit in the vicinity of its one junction line when such unit is in the soldering zone;

resilient urging means connected to said support means for urging said appliance to its said work position;

retracting means operatively associated with said support means for moving said appliance into its retracted position when a unit leaves the soldering zone; and release means disposed for responding to the entrance of a unit into the soldering zone and connected to said retracting means for freeing said support means from the influence of said retracting means, thereby to permit said appliance to move to its work position under the influence of said resilient urging means.

References Cited

UNITED STATES PATENTS

| | | | |
|---|---|---|---|
| 1,377,339 | 5/1921 | Hake | 228—43 XR |
| 1,996,131 | 4/1935 | Vreeland | 228—11 |
| 2,235,681 | 3/1941 | Haven et al. | 65—58 XR |
| 2,785,281 | 3/1951 | Heinle et al. | 219—85 |
| 2,962,995 | 12/1960 | Smith | 228—10 |
| 3,000,338 | 9/1961 | Sillars | 228—8 |
| 3,122,117 | 2/1964 | Marzullo et al. | 228—10 |

S. LEON BASHORE, Primary Examiner

J. B. HARDAWAY, Assistant Examiner

U.S. Cl. X.R.

29—503; 65—58; 228—33, 51

UNITED STATES PATENT OFFICE
CERTIFICATE OF CORRECTION

Patent No. 3,543,385                    Dated December 1st, 1970

Inventor(s) Gustave Javaux and Jean-Pierre Vasseur

It is certified that error appears in the above-identified patent and that said Letters Patent are hereby corrected as shown below:

In the heading, line 10, change "31,916" to --51,916--. Column 1, line 18, change "a multiple pane glazing unit" to --the production of multiple pane glazing units--. Column 8 line 61, after "it" insert --is--. Column 10, line 38, change "lift" to --left--.

Signed and sealed this 25th day of May 1971.

(SEAL)
Attest:

EDWARD M. FLETCHER, JR.                WILLIAM E. SCHUYLER, JI
Attesting Officer                      Commissioner of Patent: